United States Patent [19]

Landgraf

[11] Patent Number: 4,501,632
[45] Date of Patent: Feb. 26, 1985

[54] WRAPPING STEEL PIPES IN A THERMOPLASTIC RIBBON

[75] Inventor: Helmut Landgraf, Duisburg, Fed. Rep. of Germany

[73] Assignee: Mannesmann AG, Duesseldorf, Fed. Rep. of Germany

[21] Appl. No.: 350,371

[22] Filed: Feb. 19, 1982

[30] Foreign Application Priority Data

Mar. 5, 1981 [DE] Fed. Rep. of Germany ....... 3109216

[51] Int. Cl.³ ...................... B29D 23/04; B32B 31/18; B32B 31/30
[52] U.S. Cl. .................................... 156/187; 156/188; 156/244.13; 156/244.18; 156/443; 156/446; 156/500
[58] Field of Search .................. 156/187, 188, 244.18, 156/244.13, 244.14, 500, 443, 446

[56] References Cited

U.S. PATENT DOCUMENTS

| | | | |
|---|---|---|---|
| 3,616,006 | 10/1971 | Landgraf et al. | 156/188 |
| 3,758,370 | 9/1973 | Sakurai et al. | 156/244.14 |
| 3,972,761 | 8/1976 | Landgraf et al. | 156/187 |
| 4,130,453 | 12/1978 | Hollister | 156/187 |
| 4,178,200 | 12/1979 | Hakert et al. | 156/187 |
| 4,211,595 | 7/1980 | Semour | 156/187 |

Primary Examiner—Caleb Weston
Attorney, Agent, or Firm—Ralf H. Siegemund

[57] ABSTRACT

A thermoplastic hose is extruced, longitudinally, but in opposite (thinned) locations, and the resulting two semi-circular sheets are flattened, superimposed with an offset, and wrapped around a rotating and axially advanced pipe. The hose may be extruded from above or from the side. The method and apparatus is applicable also for high-density PE (e.g., 0.95).

9 Claims, 4 Drawing Figures

WRAPPING STEEL PIPES IN A THERMOPLASTIC RIBBON

BACKGROUND OF THE INVENTION

The present invention relates to jacketing of steel pipes or tubes with a thermoplastic envelope, particularly an envelope of polyethylene.

German printed patent No. 17 71 764 (see also U.S. Pat. No. 3,616,006) describes a method of wrapping a thermoplastic ribbon around an axially movable and rotating pipe so that the envelope produced is of a helical configuration; an adhesive is interposed between the strip or ribbon and the tube. In particular, a wide nozzle extrudes a flat thermoplastic strip which runs toward the cleaned, heated, rotating, and axially movable pipe to, thereby, become wrapped around that pipe. The adhesive is concurrently extruded to lodge in between the thermoplastic strip and the pipe. The two extruded ribbons overlap and weld thermoplastically along the edges. Further for the state of the art, see U.S. Pat. Nos. 4,178,200 and 3,972,761.

The method described above is a satisfactory one; but it was found that upon using a high-quality polyethylene of high density (e.g., 0.95), one needs very high pressure to operate the wide nozzle, and the throughput will be lower than in the case of a low-density polyethylene. Moreover, for a rather wide nozzle the flow of the material may become irregular, resulting in surface defects so that the desired areal welding of overlapping strip portions is interfered with.

In a different field of art, extrusion of thermoplastic tubes with a circular cross section, it has been observed that the flow field of the extruded material has rotational symmetry. This fact alone is highly beneficial for the quality of the resulting product which is, for reasons of that symmetry superior to the quality obtainable with a wide flat nozzle. One has used this approach by making thermoplastic foils via such a tube, and cutting and flattening it. One could try to make a polyethylene ribbon in that fashion; i.e., cutting longitudinally such a tube, or just flattening it prior to the wrapping process. Cutting and flattening the tube requires a fairly large distance between extrusion head and pipe unless one will introduce undue stretching into the material, particularly at the edges. Moreover, the handling of freshly extruded polyethylene is not desirable because it is prone to stick and will cool rapidly before being completely flat.

DESCRIPTION OF THE INVENTION

It is an object of the present invention to provide for a new method and apparatus for jacketing pipes into a thermoplastic ribbon which avoids the difficulties of wide-gap extrusion nozzles.

It is another object of the present invention to provide a new method and equipment for jacketing steel pipes into a thermoplastic ribbon, such as polyethylene having a density above the low-density material (density 0.93).

It is a specific object of the present invention to provide a new and improved method and equipment for jacketing a rotating and axially advancing steel pipe into a ribbon of extruded material, preferably with adequate overlap of adjacent loops, permitting complete welding of the over-lapping loop portions.

In accordance with the preferred embodiment of the present invention, it is suggested to extrude a thermoplastic hose, preferably having two oppositely located, thin wall portions, to cut the hose at these wall portions in order to produce two semi-circular sheets which are, subsequently, flattened and combined in an overlay, preferably in a lateral offset relation, in order to wrap the rotating and axially moving pipe into this two-ply ribbon. The lateral offset is obtained by orienting the common cutting plane oblique to the pipe's axis. The cutters are preferably heated. The extruder can be oriented vertically or horizontally. The method and the apparatus are applicable to low- and high-density polyethylene and other thermoplastics.

DESCRIPTION OF THE DRAWINGS

While the specification concludes with claims, particularly pointing out and distinctly claiming the subject matter which is regarded as the invention, it is believed that the invention, the objects and features of the invention, and further objects, features and advantages thereof, will be better understood from the following description taken in connection with the accompanying drawings, in which:

Proceeding now to the detailed description of the drawings, FIG. 1 illustrates a steel pipe 1, rotating as indicated by arrow 1a and moving, additionally, axially, i.e., transversely, to the plane of the drawings. Rolls 2 impart rotation upon the pipe; axial movement is provided for conventionally otherwise. It may be presumed that the pipe 1 is advanced by 200 mm per revolution; the pipe may have an outer diameter of 48 inches. These and other dimensions are, of course, by way of example only; but as stated above, the invention is particularly useful for jacketing large diameter pipes.

Figure 2:
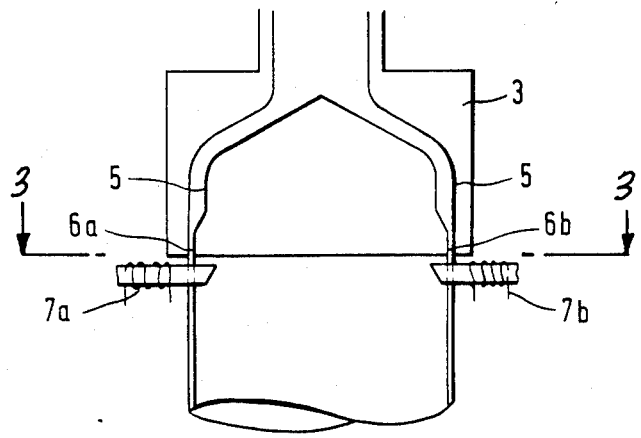
FIG. 2 is a section through a particular portion of the extrusion head shown in FIG. 1.
Figure 3:
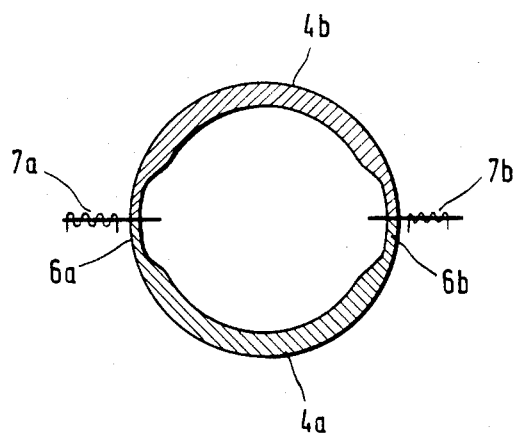
FIG. 3 is a section taken along line 3—3 in FIG. 2.

Reference numeral 3 refers to an extrusion head and nozzle structure for extruding an annular hose, i.e., a thin-walled tube 4, through an annular nozzle proper (5). By way of example, nozzle gap 5 has a mean diameter of 635 mm and a 1-mm width. The nozzle gap is reduced at two oppositely positioned locations 6a and 6b (FIGS. 2 and 3) to an approximately 0.5 mm width.

Two electrically heated cutters or cutting knives 7a and 7b are respectively disposed directly underneath the narrow nozzle gap portions 6a and 6b. These cutters cut the hose 4 longitudinally into two half-shell-like configurations 4a and 4b. In other words, the polyethylene hose is cut into two sheets 4a and 4b of a semicircular cross section; each sheet is a little under 1 m wide.

Figure 1:
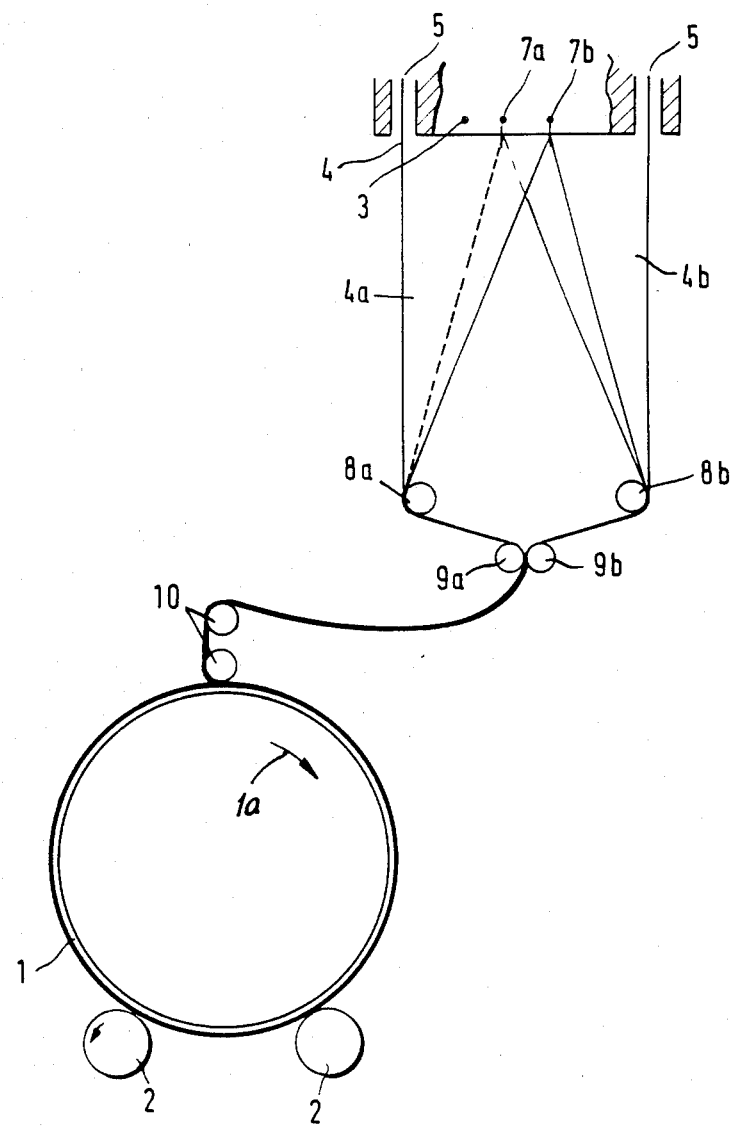
FIG. 1 is a schematic view of an extrusion head and of a steel pipe to be wrapped in a ribbon in accordance with the preferred embodiment of the invention for practicing the best mode thereof.

The extrusion head 3 is disposed approximately two meters above the apex of the pipe, but is also laterally displaced thereto, the lateral offset being between half a meter and one meter. Moreover, the head should be rotatably mounted but fixed in an adjusted position, particularly for orienting the common (vertical) plane of cutting the hose in relation to the pipe and its axis. Please note that the cutting plane is not at right angles to the plane of the drawing of FIG. 1 as illustrated by the offset relation of cutters 7a and 7b. This offset amounts to above 100 mm in the plane of this drawing. As a consequence, the two sheets 4a and 4b are laterally offset to each other by that amount of 100 mm, which is equal to half the value of the axial progression of the pipe per revolution.

The two rollers 8a and 8b are disposed approximately 1.5 mm underneath the extrusion head 3, and they are spaced by a distance that is approximately equal to the diameter of the extruded hose (i.e., the diameter of the gap 5). Additional support rollers may be provided and a partition may extend in the cutting plane, as defined by the two cutters and above rollers 8a and 8b, in order to avoid contact between the cut hose portions.

Rolls 8a and 8b and others which may engage the freshly extruded polyethylene are made of, or coated with, TEFLON or SILICON rubber. They should be mounted in high-quality bearings so that they rotate quite easily. The relatively long rolls 8a and 8b take up oppositely emerging half-hoses 4a and 4b, flatten them, and run them toward a pair of combining rolls 9a and 9b. Due to the above-explained offset and oblique orientation of the cutting plane, the sheets do not register but are laterally offset from each other by 100 mm.

The rolls 9a and 9b are likewise coated with TEFLON or SILICON rubber and run the two foils 4a and 4b into intimate contact with each other. Actually, rolls 9a and 9b are resiliently urged toward each other so that welding pressure is exerted upon the two foils 4a and 4b. Rolls 9a and 9b may have a surface-matching contour which interengages. As a consequence, the resulting two-ply foil has a slight, longitudinal, corrugating pattern and configuration.

The speed of rotation of rolls 9a and 9b should be adjustable; and that speed should, in particular, be related to the extrusion speed and to the peripheral speed of pipe 1 so that the two-ply foil or ribbon is stretched to a significant degree; the reduction in thickness of the foil should be at approximately a factor of 2.

Reference numeral 10 refers to a pair of deflection pulleys which actually run the two-ply foil onto the surface of the pipe. The material should hang between rolls 9a and 9b, on one hand, and deflection pulleys 10, on the other hand. The stretching is, thus, provided between rolls 9a and 9b and the extrustion head, and, possibly, also to some extent between the downstream one of the two pulleys 10 and the pipe.

It can be presumed that an adhesive ribbon is also extruded and applied to lodge between the two-play thermoplastic ribbon and the pipe. This is carried and explained in the prior art cited above. In principle, any other kind of adhesive application can be used.

Figure 4:
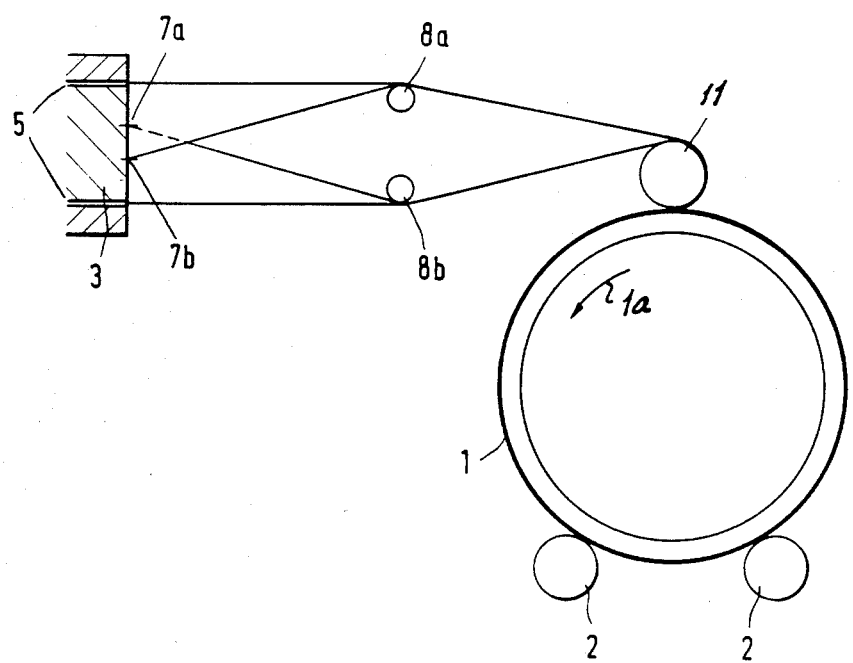
FIG. 4 is a view similar to FIG. 1, in parts showing a different orientation between extruder head and pipe.

FIG. 4 illustrates a modification of the wrapping device in that the nozzle 3 extrudes laterally. One does not need combining rolls such as 9a and 9b in FIG. 1; rather the two semicircular sheets 4a and 4b are run together onto a roll 11 which, in turn, causes the two-ply ribbon to be wrapped around the pipe. This arrangement is particularly suitable if a local thickening of the thermopolastic envelope is desired above a welding seam of the pipe, as is disclosed in U.S. Pat. No. 3,972,761.

The invention is not limited to the embodiments described above; but all changes and modifications thereof, not constituting departures from the spirit and scope of the invention, are intended to be included.

I claim:

1. A method of enveloping steel pipes in a thermoplastic jacket while such a pipe rotates and advances axially, comprising the steps of:

extruding a thermoplastic hose by means of an extruder having an annular nozzle;
cutting the hose as extruded in two locations to obtain two sheets of semicircular cross section;
flattening each of the sheets;
combining the two sheets with partial overlap to obtain in part a two-ply ribbon with an offset of but one layer along a two-ply portion; and
running the ribbon toward the pipe to obtain a helical wrapping of the ribbon around the pipe on account of its axial and rotational movement.

2. A method as in claim 1 and including the step of selecting the offset to be approximately equal to half an axial progression of the pipe per revolution.

3. A method as in claim 1, wherein the two locations are oppositely located.

4. A method as in claim 2, including the step of extruding the hose to have two thinner portions in opposite locations, the cutting being carried out along these thinner portions.

5. An apparatus for enveloping steel pipes in a thermoplastic jacket while such a pipe axially advances and rotates about an axis, comprising:

an extruder having an annular nozzle for extruding a thermoplastic hose;
two heated cutters disposed in a common cutting plane for cutting the hose as extruded in two points to obtain two sheets of semicircular cross section, said cutting plane being inclined and oblique to the axis of the pipe and its direction of advance;
means disposed for flattening the two sheets as cut;
means disposed for combining the two sheets as flattened with a lateral offset on account of said inclined orientation of the said plane to obtain a two-ply ribbon; and
means for running the ribbon toward the pipe to obtain a helical wrapping of the ribbon around the pipe on account of its axial and rotational movement.

6. An apparatus for enveloping steel pipes in a thermoplastic jacket while such a pipe axially advances and rotates, comprising:

an extruder having an annular nozzle for extruding a thermoplastic hose;
two heated cutters, disposed in a common cutting plane for cutting the hose as extruded in two points to obtain two sheets of semicircular cross section;
the annular nozzle having two narrow gap portions adjacent to said two cutters;
means disposed for flattening the two sheets as cut;
means disposed for combining the two sheets as flattened to obtain a two-ply ribbon; and
means for running the ribbon toward the pipe to obtain a helical wrapping of the ribbon around the pipe on account of its axial and rotational movement.

7. An apparatus as in claim 6, wherein the extruder is disposed above and laterally offset from the pipe for extruding in vertical down-direction, the means for combining being two additional rolls, all disposed below the extruder.

8. An apparatus as in claim 6, said extruder being disposed above the pipe and extruding in an essentially horizontal direction, the flattening means including two rolls, the combining means including a single roll, the two rolls disposed for feeding the sheets substantially horizontally onto the single roll.

9. An apparatus as in claim 6 or 8, the means for flattening and the means for combining being provided for superposing the two sheets in a laterally offset selection.

* * * * *